(12) United States Patent
Singh et al.

(10) Patent No.: US 10,610,826 B2
(45) Date of Patent: Apr. 7, 2020

(54) METHOD AND SYSTEM FOR TREATMENT OF A GAS STREAM THAT CONTAINS CARBON DIOXIDE

(71) Applicant: GENERAL ELECTRIC COMPANY, Schenectady, NY (US)

(72) Inventors: Surinder Prabhjot Singh, Niskayuna, NY (US); Dan Hancu, Clifton Park, NY (US); Benjamin Rue Wood, Niskayuna, NY (US); Wei Chen, Clifton Park, NY (US); Irina Pavlovna Spiry, Glenville, NY (US); Joseph Philip DiPietro, Oklahoma City, OK (US)

(73) Assignee: Baker Hughes, A GE Company, LLC, Houston, TX (US)

( * ) Notice: Subject to any disclaimer, the term of this patent is extended or adjusted under 35 U.S.C. 154(b) by 49 days.

(21) Appl. No.: 15/197,962

(22) Filed: Jun. 30, 2016

(65) Prior Publication Data
US 2018/0001259 A1 Jan. 4, 2018

(51) Int. Cl.
*B01D 53/62* (2006.01)
*B01D 53/14* (2006.01)
(Continued)

(52) U.S. Cl.
CPC ......... *B01D 53/78* (2013.01); *B01D 53/1425* (2013.01); *B01D 53/1475* (2013.01);
(Continued)

(58) Field of Classification Search
None
See application file for complete search history.

(56) References Cited

U.S. PATENT DOCUMENTS

| 3,837,143 A | * | 9/1974 | Sutherland | ......... B01D 53/1425 95/162 |
| 8,007,570 B2 | | 8/2011 | Sonwane et al. | |

(Continued)

OTHER PUBLICATIONS

Pouryousefi et al., "New Analytical Techniques for CO2 Capture Solvents", 2006 IEEE EIC Climate Change Conference, pp. 1-8, May 10-12, 2006, Ottawa, ON.
(Continued)

*Primary Examiner* — Daniel Berns
(74) *Attorney, Agent, or Firm* — Bakes Hughes Patent Organization

(57) ABSTRACT

A method for separating carbon dioxide ($CO_2$) from a gas stream is disclosed, in which the gas stream is reacted with a lean aminosilicone solvent in an absorber, resulting in a rich aminosilicone solvent that is then treated in a desorber to release the $CO_2$ and regenerate lean aminosilicone solvent in a desorption reaction. The regenerated solvent is directed into a steam-producing, indirect heat exchanger that is configured to supply steam to the desorber at a temperature high enough to augment the desorption reaction. Also, selected amounts of make-up water are added to the rich aminosilicone solvent at one or more process locations between the absorber and the desorber, to lower the viscosity of the solvent and to lower the temperature required for the desorption reaction.

23 Claims, 2 Drawing Sheets

(51) Int. Cl.
    *B01D 53/78*     (2006.01)
    *B01D 53/96*     (2006.01)

(52) U.S. Cl.
    CPC ......... *B01D 53/1493* (2013.01); *B01D 53/62* (2013.01); *B01D 2252/204* (2013.01); *B01D 2252/2023* (2013.01); *B01D 2252/2041* (2013.01); *B01D 2252/504* (2013.01); *B01D 2258/0283* (2013.01); *Y02C 10/04* (2013.01); *Y02C 10/06* (2013.01)

(56) References Cited

U.S. PATENT DOCUMENTS

| | | |
|---|---|---|
| 8,500,855 B2 | 8/2013 | Eisenberger |
| 8,911,539 B2 | 12/2014 | Chinn et al. |
| 9,186,617 B2 | 11/2015 | Calabro et al. |
| 9,314,732 B2 | 4/2016 | Reddy et al. |
| 2010/0154431 A1 | 6/2010 | Genovese et al. |
| 2010/0158777 A1* | 6/2010 | Perry .................. B01D 53/1475 423/230 |
| 2011/0100217 A1* | 5/2011 | Soloveichik ....... B01D 53/1475 95/179 |
| 2013/0052109 A1 | 2/2013 | Davis et al. |
| 2013/0229012 A1* | 9/2013 | Jovanovic ............... F01K 11/02 290/52 |
| 2014/0178278 A1 | 6/2014 | Siskin et al. |
| 2016/0175770 A1 | 6/2016 | Spiry et al. |
| 2019/0111380 A1* | 4/2019 | Dowdle ............. B01D 53/1456 |

OTHER PUBLICATIONS

Zheng et al., "CO2 Solubility in a Mixture Absorption System of 2-Amino-2-methyl-1-propanol with Glycol", Industrial & Engineering Chemistry Research, vol. 51, Issue: 34, pp. 11236-11244, 2012.

* cited by examiner

METHOD AND SYSTEM FOR TREATMENT OF A GAS STREAM THAT CONTAINS CARBON DIOXIDE

STATEMENT REGARDING FEDERALLY SPONSORED RESEARCH AND DEVELOPMENT

This invention was made with Government support under contract number DE-FE0026498 awarded by the Department of Energy (DOE). The government has certain rights in this invention.

TECHNICAL FIELD

This disclosure relates generally to the field of carbon dioxide ($CO_2$) separation. In some specific embodiments, the disclosed invention relates to a process and system for $CO_2$ removal from a post-combustion flue gas through the use of a chemical solvent, including the recovery of the solvent during the process.

BACKGROUND OF THE INVENTION

A number of commercial or industrial processes produce $CO_2$ as a byproduct. Examples include natural gas processing, steam reforming of methane, enhanced oil recovery, gas recycling, and power generation. As a specific illustration in the case of a power plant, a flue gas is produced when coal or other types of fuel are burned in air. The heat released by combustion generates steam, which drives a turbine generator for producing electric power. Hot combustion gases exiting the boiler include nitrogen and smaller concentrations of water vapor and carbon dioxide. Other constituents, formed from impurities in coal, include sulfur dioxide, nitrogen oxides, and particulate matter (fly ash). Such pollutants must be removed to meet environmental standards. In many instances, it is highly desirable to capture or otherwise separate the $CO_2$ from the gas mixture to prevent the release of $CO_2$ into the environment.

Many current $CO_2$ absorption processes involve aqueous amine-based solvents, where the solvent is brought into contact with the exhaust gases to capture $CO_2$ from them. In addition, experiments are in progress to test the efficacy of non-aqueous aminosiloxane solvents for $CO_2$ capture. These processes result in primarily two different streams—a clean gas stream and a $CO_2$-rich solvent stream. In many current setups, the $CO_2$-rich solvent stream is recovered and regenerated.

To reduce the volumes of solvent being utilized for $CO_2$ recovery processes, desorption systems are also utilized at the end of an absorption cycle to separate $CO_2$ and recover the solvent from the $CO_2$-rich solvent stream. Examples of desorption systems include, but are not limited to, stripping columns, and the like.

However, systems that include $CO_2$-absorption as well as $CO_2$-desorption processes are typically capital intensive; and their complexity can result in high maintenance costs. In the case of using non-aqueous aminosiloxane solvents, some of the cost relates to the relatively high viscosity of the solvent after it has absorbed $CO_2$. Moreover, some of the solvents are relatively expensive to manufacture, and replacing solvent lost during the treatment process can have adverse economic effects. Other costs relate to the energy required in heating and cooling the absorbent fluid during the various thermal cycles in the overall process. Moreover, excessive exposure to heat during the absorption/desorption processes can degrade some of the newer, non-aqueous aminosiloxane solvents.

With these observations and concerns in mind, additional improvements in separating carbon dioxide from flue gas and other exhaust streams would be welcome in the art. The new processes should increase the efficiency of the overall process, e.g., by relying on lower process temperatures. The processes should also recover relatively high amounts of the treatment solvents.

SUMMARY OF THE INVENTION

Some embodiments of this invention are directed to a method for separating carbon dioxide ($CO_2$) from a gas stream, comprising the following steps:

a) feeding an initial gas stream to an absorber through which a lean aminosilicone solvent circulates;

b) reacting the gas stream with the lean aminosilicone solvent within the absorber at a first temperature range, so as to generate a rich aminosilicone solvent stream and a clean gas stream with reduced $CO_2$ in comparison with the initial gas stream;

c) directing the rich aminosilicone solvent stream to a desorber (solvent regenerator) that heat-treats the rich solvent in an endothermic desorption/regeneration reaction that is carried out at a second temperature range higher than the first temperature range; to regenerate lean aminosilicone solvent and to produce carbon dioxide gas;

d) directing the regenerated, lean aminosilicone solvent through a steam-producing, indirect heat exchanger configured to supply steam to the desorber apparatus at a temperature high enough to augment the desorption reaction, while also providing a heat of reaction sufficient to sustain the endothermic desorption reaction and to lower the partial pressure of $CO_2$ in the vapor phase in the lower region of the desorber;

e) boiling an amount of steam in the indirect heat exchanger in excess of an amount that is required to provide the heat of reaction for aminosilicone desorption, so as to maintain steam in the vapor phase in the upper region of the desorber; and f) adding selected amounts of make-up water to the rich aminosilicone solvent stream, at one or more process locations between an exit site for the absorber and an inlet site for the desorber, to lower the viscosity of the rich aminosilicone solvent and to lower the temperature required for the desorption reaction.

Other embodiments of the invention relate to a method for separating carbon dioxide ($CO_2$) from a gas stream, comprising the steps of reacting the gas stream with a lean aminosilicone solvent in an absorber, resulting in a rich aminosilicone solvent that is then treated in a desorber to release the $CO_2$ and regenerate lean aminosilicone solvent in a desorption reaction; wherein the regenerated solvent is directed into a steam-producing, indirect heat exchanger configured to supply steam to the desorber at a temperature high enough to augment the desorption reaction; and wherein selected amounts of make-up water are added to the rich aminosilicone solvent at one or more process locations between the absorber and the desorber, to lower the viscosity of the solvent and to lower the temperature required for the desorption reaction.

BRIEF DESCRIPTION OF THE DRAWING FIGURES

DETAILED DESCRIPTION OF THE INVENTION

It should be noted that when introducing elements of various embodiments of the present invention, the articles "a," "an," "the," and "said" are intended to mean that there are one or more of the elements, unless otherwise indicated. Moreover, the term "and/or" includes any and all combinations of one or more of the associated listed items. The terms "comprising," "including," and "having" are intended to be inclusive, and mean that there may be additional elements other than the listed elements. Approximating language, as used herein throughout the specification and claims, may be applied to modify any quantitative representation that could permissibly vary without resulting in a change in the basic function to which it is related. Accordingly, a value modified by a term or terms, such as "about" or "substantially" is not to be limited to the precise value specified. In some instances, the approximating language may correspond to the precision of an instrument for measuring the value.

Some definitions of other terminology used in this disclosure may also be helpful. The term "clean flue gas" may be referred to as a flue gas with a reduced level of $CO_2$. (It should be understood that for these invention embodiments, the flue gas can in fact be any type of gaseous fluid stream that contains $CO_2$). The term "lean solvent" may be referred to as a solvent with a substantially reduced level of $CO_2$. The term "rich solvent" may be referred to as a solvent having an increased level of $CO_2$. Specifically, the "rich solvent" may be referred to as a solvent having an increased level of $CO_2$ relative to the "lean solvent", as a result of absorbing the $CO_2$ from the flue gas. A minimal concentration difference between the rich solvent and the lean solvent may be about 1% by weight.

Figure 1:
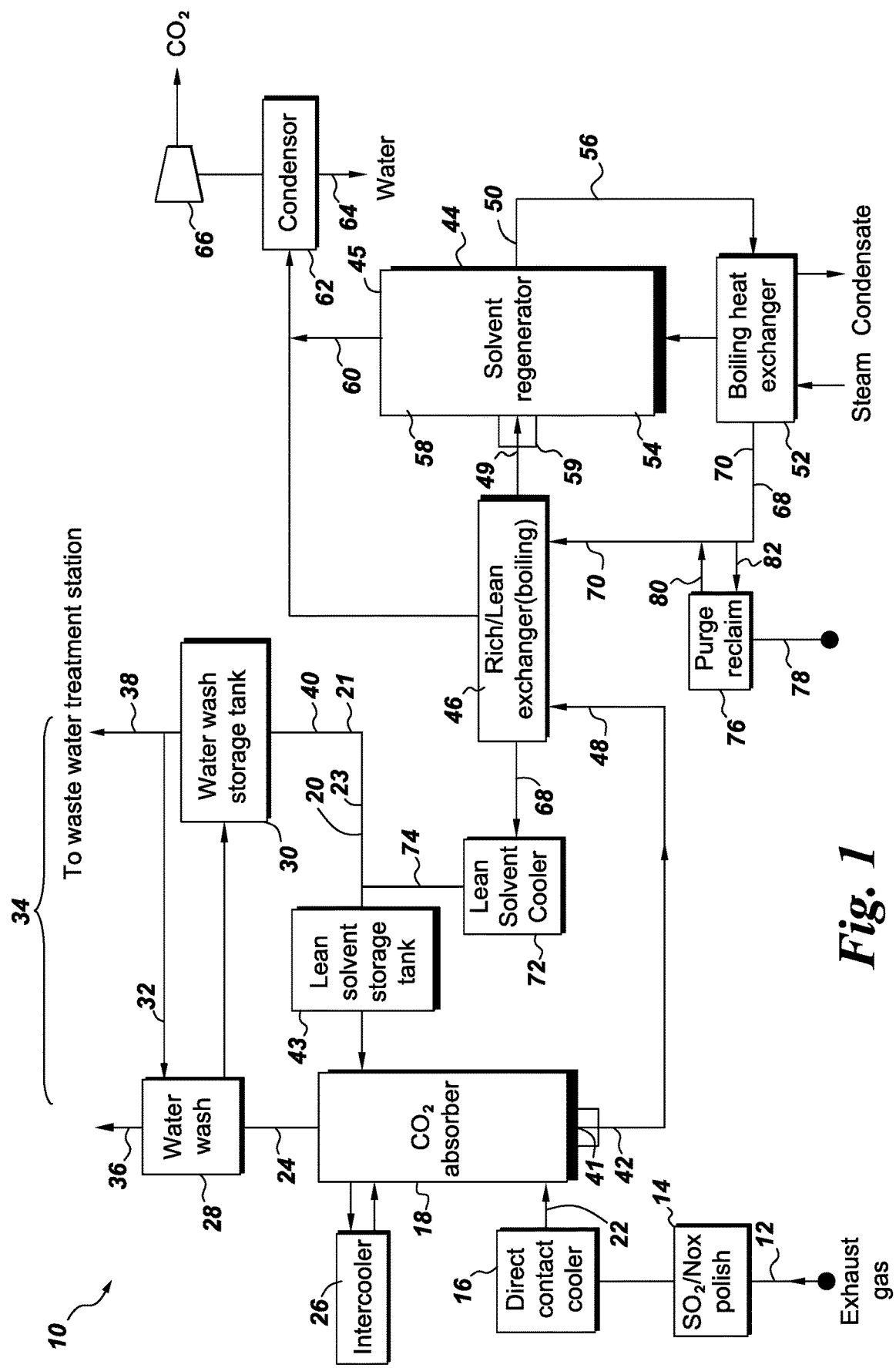
FIG. 1 is a schematic illustration of a system for $CO_2$ separation from a gas stream, in accordance with one embodiment of the invention.

FIG. 1 is a schematic block diagram illustrating a system 10 for treatment of a flue gas 12 in accordance with an exemplary embodiment. Depending in part on the contents of the flue gas, the system usually includes at least one sulfur dioxide/nitrogen oxide ($NO_x$) treatment unit 14. Treatment techniques for reducing or eliminating these impurities are well-known in the art. Non-limiting examples include selective catalytic reduction (SCR) techniques for the $NO_x$ compounds, and various scrubbing techniques for the sulfur compounds. Electrostatic precipitators may also be present, to remove various particulate matter.

The system 10 can also include a cooling device, such as direct contact cooler (DCC) 16, coupled to absorber 18. The DCC functions to partially remove water from the flue gas, and to adjust the temperature of the gas that enters the absorber. In general, the absorption of $CO_2$ is more efficient at lower temperatures. Usually, the temperature of the treated flue gas 22 (i.e., treated in unit 14 to reduce $SO_2$/$NO_x$) entering absorber 18 will be in the range of about 20° C. to about 50° C. The most appropriate temperature range will depend on a number of factors, such as the amount of $SO_2$/$NO_x$ in the exhaust stream; and the efficiency of the absorber. It should also be noted that the absorber 18 can be in a variety of shapes and designs, but is often in the shape of a cylindrical tower.

A lean solvent 20 is also fed into absorber 18. As generally depicted in FIG. 1, the treated flue gas 22 is usually fed into a lower region of the absorber, relative to the location at which the lean solvent is fed into the absorber. In some embodiments, the flue gas is advantageously provided to the absorber at a location such that an induced countercurrent flow exposes the gas stream, when it has the lowest $CO_2$ concentration, to the portion of the liquid solvent which is the most lean. Furthermore, the gas stream with the highest $CO_2$ concentration is exposed to the liquid solvent stream that has substantially reacted with the $CO_2$. As used herein, the "lower region" of a column-shaped absorber can be defined generally as the lowest 25% of the height of the column (and usually measured above any sump that may constitute the very bottom of the column).

As noted above, the lean solvent 20 absorbs the $CO_2$ from the flue gas 22 during passage through absorber 18, to generate a clean flue gas 24, along with the $CO_2$-rich solvent. The absorption reaction usually occurs at a first temperature range of about 25° C. to about 80° C. (and most often, about 40° C. to about 75° C.), and is highly exothermic. Therefore, various cooling devices may be used to control the temperature in absorber 18. As a non-limiting example, a heat exchanger such as intercooler 26 can be employed to recirculate a portion of the lean solvent, to decrease its temperature.

In some embodiments, the clean fluid stream 24 is directed to a water wash unit 28, usually supplied by at least one source of water, and configured to separate a stripped portion of the lean solvent from the clean fluid stream. In this manner, a $CO_2$-depleted exhaust gas and a mixture of the water and the stripped portion of the lean solvent are generated. (At least a portion of the stripped portion of the lean solvent can be directed to the water-wash storage tank).

Water wash units are generally known in the art, and may involve one or more water spray devices, e.g. spray columns, as well as a water wash storage tank 30, which contains water and, usually, some residual solvent. The overall system may also include a lean solvent storage tank 43, which, along with the water wash storage tank, can function as a buffer, controlling the input of water and solvent into the absorber. The system also includes a source of water 32 that may be part of an overall water wash/water-circulation system 34 encompassing wash system 28; water wash storage tank 30, lean solvent storage tank 43, and water source 32.

The water wash unit 28, in conjunction with water wash storage tank 30, removes a portion of the residual solvent and other impurities from the fluid stream 24, resulting in a "washed clean flue gas" 36 that can be vented to the atmosphere. Wastewater 38 that exits the water-circulation system 34 can be directed to an appropriate wastewater treatment station or other facility. The recovered lean solvent 40 can be combined with lean solvent 20 and directed back to absorber 18 along pathways 21 and 23. Other aspects of the water wash unit and water-circulation system are discussed below.

The carbon dioxide absorbent for the present invention comprises a liquid, nonaqueous silicon-based material. "Silicon-based materials" are defined as molecules having between one and twenty repeat units, and thus, may include small molecules comprising silicon, i.e., molecules comprising from one to five silicon atoms, or oligomeric materials comprising between about 5 and 20 silicon atoms.

Of these materials, silicones are particularly well-suited for use in the present absorbents. Also correctly referred to as polymerized "siloxanes" or "polysiloxanes", silicones are mixed inorganic-organic polymers or oligomers with the chemical formula $[R_2SiO]_n$, wherein R comprises a linear, branched or aromatic organic group of any number of carbons, e.g., methyl, ethyl, phenyl, and the like. While the silicone materials preferred herein are nonaqueous, they are used in water-containing systems according to embodiments of the present invention.

The preferred silicone materials for most embodiments are the aminosilicones. Such materials are generally described in various references. Examples include U.S. Patent Publications 2013/0052109 (Davis et al) and 2010/0154431 (Genovese et al); as well as U.S. patent application Ser. No. 14/578,606 (Spiry et al), all incorporated herein by reference. In some embodiments, the aminosiloxane has the formula:

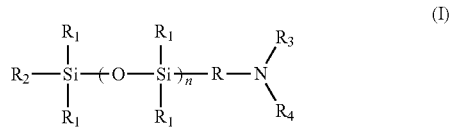

(I)

wherein n is an integer more than 1, R is a $C_1$-$C_6$ aliphatic radical; $R_1$ is independently at each occurrence a $C_1$-$C_{10}$ aliphatic or aromatic radical; and $R_2$ is $R_1$ or $RNR_3R_4$, wherein $R_3$ and $R_4$ are independently at each occurrence a bond, hydrogen, or a $C_1$-$C_{10}$ aliphatic radical. A specific example of an aminosilicone preferred for some embodiments is an aminopropyl-terminated polydimethylsiloxane shown below in formula (II), wherein "Me" is a methyl group; and which is often referred to as "GAP-1":

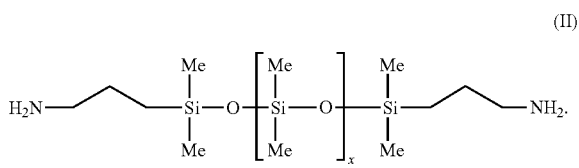

(II)

The selected aminosilicone is functionalized with one or more groups that reversibly react with $CO_2$, and/or have a high affinity for $CO_2$. Usually, the attached groups are nitrogen-containing groups. In preferred embodiments, the functional group comprises a primary or secondary aliphatic or aromatic amine, imine, amidine, a heterocyclic amino compound, or various combinations thereof.

The aminosilicone solvent is usually employed in admixture with at least one hydroxy-containing solvent (sometimes referred to as a "co-solvent"), to form a solvent system. As used herein, the phrase "hydroxy-containing solvent" means a solvent that has one or more hydroxy groups. Usually, the hydroxy-containing solvent also desirably has a low vapor pressure, e.g., of from about 0.001 to about 30 mm/Hg at about 100° C., so that minimal loss of the hydroxy-containing solvent occurs via evaporation.

Moreover, suitable hydroxy-containing solvents are those that do not substantially chemically react with $CO_2$, but rather, serve as a medium for $CO_2$ transfer to the aminosiloxane solvent present in liquid stream 20, as depicted in FIG. 1. As a result, the hydroxy-containing solvents are expected to be capable of increasing the reaction rate, e.g., by increasing the mass transfer rate of $CO_2$ and aminosiloxanes, and also, to reduce, or substantially prevent, excessive viscosity build-up when the aminosiloxane from the liquid stream 20 reacts with $CO_2$ from the gas stream 22. Advantageously, many suitable hydroxy-containing solvents may be recycled, along with the aminosiloxane, if desired.

Examples of suitable hydroxy-containing solvents include, but are not limited to, those comprising one or more hydroxyl groups, such as glycols and hydroxylated silicones. Some of the suitable glycols may include, for example, trimethylolpropane, glycerol, ethylene glycol, diethylene glycol, triethylene glycol (TEG), and tetraethylene glycol, to name a few. Suitable hydroxylated silicones include, for example, 1,3-bis(3-hydroxypropyl)tetramethyldisiloxane, or the hydrosilylation reaction product of 1,1,3,3-tetramethyldisiloxane and trimethylolpropane allylether. Hydroxy compounds may also be in the form of phenols such as eugenol, isoeugenol, 2-allyl-6-methylphenol, and the like. In many preferred embodiments, the hydroxy-containing solvent is a glycol, with triethylene glycol being especially preferred for some end use applications.

The weight ratio of the aminosiloxane to co-solvent in the lean solvent stream may be about 10:90, on a dry basis, i.e., not including the amount of make-up water that is selectively added, as described below. In certain embodiments, the weight fraction of aminosiloxane in the liquid solvent may vary from about 10% by weight to 95% by weight. In one embodiment, the weight fraction of aminosiloxane in the lean solvent stream may vary from about 30% by weight to about 80% by weight, while the co-solvent weight fraction may vary from about 70% by weight to about 20% by weight. In another embodiment, the weight fraction of aminosiloxane in the lean solvent stream may vary from about 50% by weight to about 70% by weight, while the co-solvent weight fraction may vary from about 50% by weight to about 30% by weight (all calculated on a dry basis).

The lean solvent stream may also include other constituents. Examples include oxidation inhibitors (antioxidants) to increase the oxidative stability, and anti-foaming agents. Additional additives that may be incorporated into the lean solvent are corrosion inhibitors. The use of antioxidants can be especially advantageous when the functional groups for the aminosilicone compounds comprise amine groups.

With continued reference to FIG. 1, the rich aminosilicone solvent 42 is directed out of the absorber—usually exiting from a lower region, in the case of a tower-type of absorber tank. As noted above, solvent 42 contains a relatively high amount of $CO_2$—usually in the form of carbamate resulting from the chemical reaction between the liquid solvent and $CO_2$ from the gas stream. The temperature of the solvent stream at this stage is usually in the range of about 40° C. to about 90° C., and in some preferred embodiments, about 40° C. to about 80° C.

Rich aminosilicone solvent 42 is directed along a suitable pathway/conduit to desorber 44. The desorber can also be referred to as a "solvent regenerator", because it releases the $CO_2$ from the solvent, as a gas, thereby regenerating a "lean" solvent. The lean solvent can be recirculated back to the absorber, as discussed below. In some embodiments, the rich solvent 42 is passed through at least one heat exchanger 46 (rich/lean exchanger) along the pathway 48/49 between the exit site of the absorber and an entry site 59 of the desorber 44. Various types of heat exchangers are suitable for this purpose, e.g., shell and tube heat exchangers; plate heat exchangers; plate and shell heat exchangers; and plate fin heat exchangers. As further mentioned below, the heat exchanger 46 can be used for two important functions. First, it increases the temperature of rich aminosilicone solvent 42 entering the heat exchanger via pathway 48. Second, it decreases the temperature of lean solvent stream 68 entering the heat exchanger via pathway 70.

Usually, the desorber/solvent regenerator 44 is in the form of a vertical column, although other shapes and designs are possible. The desorber may take the form of a stripper column, and in some instances, may be a type of continuous stirred tank reactor (CSTR). It operates by heat-treating the rich solvent in an endothermic desorption/regeneration reaction. As further described below, the endothermic reaction regenerates lean aminosilicone solvent, while also producing carbon dioxide gas.

The endothermic reaction within desorber 42 must be carried out at a second temperature range higher than the first temperature range, i.e., higher than the absorption reaction temperature. In many instances, this second temperature range is from about 90° C. to about 140° C., and in some specific embodiments, from about 105° C. to about 125° C. (These ranges are described for saturated conditions for the solvent system within the desorber). The relatively high temperature requirements are due in part to the relatively high boiling point for the aminosilicone solvent. Moreover, the chemical bonding involved in forming the carbamate-type compounds requires a considerable amount of thermal energy to break those bonds and release the $CO_2$. Desorption pressure ranges will depend in part on the particular temperature conditions present, but usually will range from about 1 bar to about 2 bar.

In order to maintain the necessary thermal energy for the desorption step, the regenerated, lean aminosilicone solvent 50 leaving desorber 44 is directed through a steam-producing, indirect heat exchanger 52. The indirect heat exchanger 52 is configured to supply steam to the desorber apparatus 44, via pathway 56, at a temperature high enough to augment the desorption reaction. This configuration can also provide the heat of reaction required to sustain the endothermic desorption reaction. Indirect heat exchanger 52 usually forms part of a circulation loop with desorber 44 and pathway 56. (It should be understood that the indirect heat exchanger can be in the form of a reboiler. Most reboilers are in the class of shell-and-tube heat exchangers, and various types are known, e.g., kettle- or thermosyphon reboilers). In other cases, the indirect heat exchanger can be in the form of certain types of CSTR reactors.

The indirect heat exchanger 52 lowers the partial pressure of $CO_2$ in the vapor phase in the lower region 54 of desorber 44. This in turn enables near-complete aminosilicone desorption at a relatively low temperature, as compared to prior art desorption processes. The lower temperature is also very important for reducing or eliminating heat-induced degradation of the aminosilicone solvent.

Indirect heat exchanger 52 is configured to boil an amount of steam in excess of the amount required to provide the heat of reaction for aminosilicone desorption. In this manner, steam can be maintained in the vapor phase in the upper region 58 of the desorption tower 44. The excess steam in the upper region also contributes to lowering the temperature required for desorption, with the attendant advantage noted previously. As used herein, the "upper region" of a column-shaped desorber can be defined generally as a region extending downwardly about 25% from the top 45 of the desorber. As mentioned above, the rich solvent to be stripped is usually directed to the desorber in this upper region. (In some cases, a condenser or partial condenser (not shown) is situated at the top of the desorber, and the inlet 59 is usually located directly below the condenser in that instance).

In practice, the actual design and operation of the absorption tower will approach a theoretical minimum when the last unit of steam is condensed in the first stage of the upper region 58 of the desorption tower. This theoretical minimum can be determined by the solvent isotherm, i.e., an experimental measurement, at a particular temperature and pressure, of how much $CO_2$ is absorbed by the solvent system, and how much $CO_2$ remains in the gas phase. (This measurement also takes into account the amount of water that is present in the system).

The carbon dioxide 60 released during the desorption reaction can be directed to any suitable separation system for a number of purposes. Examples include enhanced oil recovery, $CO_2$ storage, or $CO_2$ sequestration. In some embodiments, the $CO_2$ stream 60 is directed to condenser 62. Water 64 that is separated in the condenser can be treated or otherwise moved to another location (as also explained below), while the $CO_2$ gas can be compressed in compressor 66, and then directed according to one of the options mentioned above, e.g., sequestration.

With continued reference to FIG. 1, the lean aminosilicone solvent 68 (stripped of carbon dioxide), is directed back to $CO_2$ absorber 18. Usually, the lean solvent is passed through at least one heat exchanger, to bring the temperature down to a range suitable for the absorption reaction, e.g., a temperature in the range of about 40° C. to about 60° C. In some embodiments, lean solvent 68 is directed through rich/lean heat exchanger 46 via pathway 70. Heat exchanger 46 is configured to extract heat from the solvent, thereby lowering its temperature.

In other embodiments, the temperature of the lean solvent can be further reduced by directing it through an additional heat exchanger or "lean solvent cooler" 72. Heat exchanger 72 can be any of the types described previously, e.g., a shell and tube heat exchanger. At this point, the lean solvent 68/20 is now at the temperature appropriate for absorption, and can be directed via pathway 74 to an inlet of the absorber column.

The design of the water wash-separation system described above provides several key advantages for embodiments of this invention. Usually, the system takes the form of a decanter, a centrifuge, or some combination thereof, relying on separation by density. Separation is often not complete, leaving a mixture of solvent and a smaller amount of water. A portion of the solvent-water mixture can be intentionally directed to absorber 18, via pathways 21 and 23.

The solvent-water mixture coming from water wash storage tank 30 allows for greater control of the amount of water entering the absorber. Since excessive amounts of water can be detrimental to the overall efficiency of the process, this control mechanism can be quite important. Moreover, the solvent-water stream (sometimes referred to herein as a "solvent-water system") can minimize or eliminate the need for any external system supplying water to the absorber.

Another advantage of directing the solvent-water mixture from water wash storage tank 30 along pathways 21 and 23 relates to temperature control. As mentioned above, the absorption reaction in absorber 18 can be highly exothermic. Thus, an additional in-system technique for cooling the absorber is very useful. The resulting, lower temperature provides additional efficiency for the absorption reaction, requiring less solvent to capture the same amount of $CO_2$.

With continued reference to FIG. 1, it is sometimes useful to incorporate a purge-reclaim station 76, at a location downstream of boiling heat exchanger 52. Station 76 is configured to remove any residual products or contaminants in the lean aminosilicone stream, such as small amounts of the aminosilicone molecule that may have become detached. The purge-reclaim station is typically configured to filter out or decant the residual byproducts via pathway 78, while fresh solvent is passed through the station, via conduits 80 and 82.

As mentioned previously, a key feature of this invention is the addition of selected amounts of water (sometimes referred to herein as "make-up" water) to the rich aminosilicone solvent stream. The make-up water lowers the viscosity of the rich aminosilicone solvent, while also lowering the temperature required for the desorption reaction. The specific addition(s) of make-up water can generally have a beneficial effect on the function of rich/lean heat exchanger 46, improving the heat transfer coefficient of the solvent passing through the heat exchanger, e.g., by lowering the pressure-drop across the heat exchanger.

The amount of make-up water to be added will depend on various factors, such as the temperature required for the desorption step carried out in tower 44; the amount of steam required for use in boiling heat exchanger 52; and the specific type of aminosilicone solvent employed. In general, the amount of make-up water is determined by the amount of water that is lost during operation of the overall process, and this in turn usually depends on the difference between the temperature of water going into absorber 18 and the temperature of the water exiting the absorber. Various locations in system 10 may be sites for water loss, e.g., desorber 44 and purge reclaim station 76. However, in some embodiments, it is thought that the site for most of the water loss may be at the top of the absorber 18, i.e., the location where clean flue gas 24 is directed to the water wash unit 28.

In some embodiments, a non-limiting estimate of water loss that requires the introduction of make-up water is about 0.1% by weight to about 5% by weight total water loss over a 24 hour period. A more specific (though still non-limiting) estimate is about 0.1% by weight to about 1.0% by weight. Loss of water can be measured by a variety of techniques, e.g., liquid level monitors, hygrometers or various other types of humidity sensors and meters, and the like.

It should be understood that the amount of make-up water that will be required over a given period of time can be expressed in terms of the amount of water that is needed to maintain the overall gas treatment system in an efficient mode. As described herein, the required amount of water will depend on a variety of process- and material factors. In some embodiments, the amount of make-up water to be added will be such that the steady state water content in the working solution (i.e., the solvent-water system) is between about 5 weight percent and about 25 weight percent. In some specific embodiments, the steady state water content is between about 5 weight percent and about 15 weight percent.

The make-up water can be added to the rich aminosilicone solvent stream, at one or more process locations between an exit site 41 for the absorber 18, and an inlet site 59 for the desorber/solvent regenerator 44. Make-up water can also be added to the absorber 18, from water wash storage tank 30, and/or from lean solvent storage tank 43.

In some embodiments, selected amounts of make-up water are preferably added at a location between the absorber and the rich-lean heat exchanger 46, i.e., along pathway 48. In other specific embodiments, selected amounts of make-up water are added at a location between rich-lean heat exchanger 46 and desorber 44, i.e., along pathway 49. The addition of make-up water can also be carried out at both locations, i.e., pathways 48 and 49. Frequently, the addition of water along pathway 48 is most significant, because it also serves to decrease the viscosity of the rich solvent prior to entry into rich/lean exchanger 46. The temperature of the make-up water is usually the ambient temperature associated with the overall treatment system.

Moreover, in some embodiments, water-condensate 64 that exits condenser 62 can be directed back to desorber 44, via pathway 49, or via another conduit (not shown). This represents an advantageous use of the excess water exiting the system, as another source of make-up water. In other instances, the water-condensate can be directed back to water wash storage tank 30, by a suitable conduit.

The addition of selected amounts of make-up water at the indicated location(s) relative to the rich/lean heat exchanger, along with the injection of steam from the boiling heat exchanger into the absorber/solvent regenerator, results in considerable advantages for the overall $CO_2$ treatment process. For example, the water lowers the viscosity of the rich solvent stream, while also improving the heat transfer coefficient in the rich/lean heat exchanger. This use of water in conjunction with a nonaqueous solvent like the aminosilicones discussed above can be considered unusual in the field of solvent-based absorption processes.

Moreover, the dual function of steam generated from the boiling heat exchanger is a unique aspect of these types of absorption processes. The steam provides the critical heat of reaction to sustain the endothermic desorption reaction, while also lowering the vapor pressure of carbon dioxide in the vapor phase. These functions are very important in a process that utilizes relatively heavy, low-pressure absorption solvents that are not readily amenable to conventional steam-stripping operations.

EXAMPLES

The following examples illustrate methods and embodiments in accordance with the invention. Unless specified otherwise, all ingredients and equipment may be commercially available from common suppliers.

Figure 2:
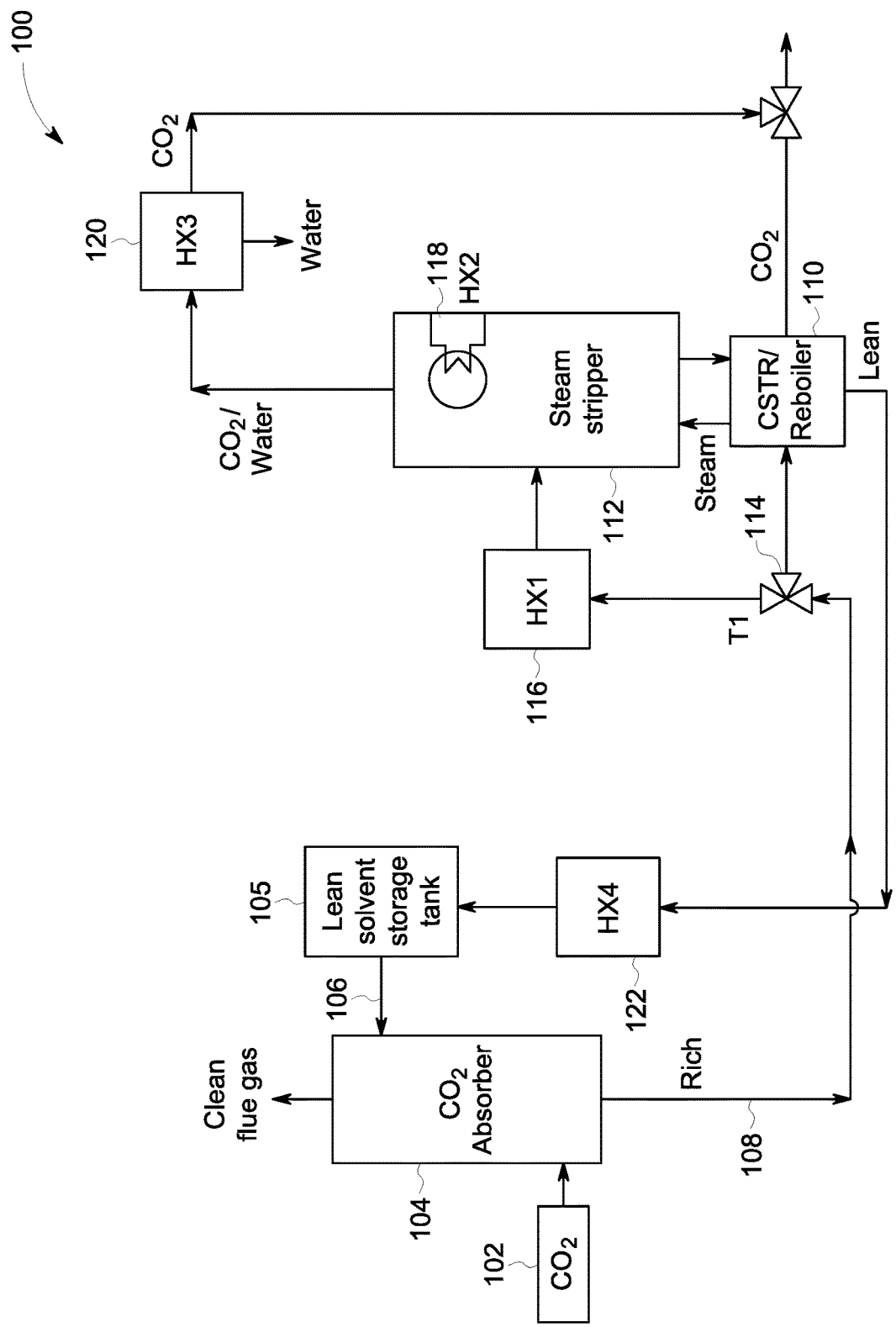
FIG. 2 is a simplified, schematic illustration of another system for $CO_2$ separation from a gas stream, in accordance with inventive embodiments.

The performance of the aminosilicone solvent for the $CO_2$ capture process in the presence of a controlled amount of water (3-13 wt. %) was measured in a continuous bench scale system featuring two separate desorption units: 1) a steam stripper column and 2) a continuous stirred tank reactor (CSTR). A schematic of the gas treatment system 100 is shown in FIG. 2, which can be considered a simplified version of the system of FIG. 1, depicting the primary features (some of which are optional) that best illustrate the example.

The $CO_2$ containing simulated exhaust 102 is fed at the bottom of the absorber column 104. Lean solvent 106 is fed to the top of the absorber column. Rich solvent 108 (i.e., after absorption of $CO_2$) is collected from the bottom of the absorber column 104, and sent to either the CSTR 110 or the steam stripper/regenerator 112.

In the operation of system 100, three way valve 114 ("$T_1$") is switched such that the rich solvent stream 108 exiting the absorber column is redirected through the rich heat exchanger 116 ("HX 1"), and the steam stripping column 112. Rich solvent flowing downwards through the steam stripping column is contacted with the steam generated in the reboiler 110. $CO_2$ generated from the decomposition of the rich solvent 108 is passed through the partial condenser 118 ("HX 2"), and total condenser 120 ("HX 3") to separate the residual steam.

The lean solvent stream collected in the CSTR/reboiler 110 is cooled in the lean heat exchanger 122("HX4") before being sent to the top of the absorber column 104. The added functionality allows sequential testing of the CSTR and steam stripper regeneration to evaluate both desorption processes under similar process conditions. A controlled amount of water is added after passage through the lean storage tank 105, prior to entering the absorber column.

Example 1

Baseline: Desorption with CSTR at 125° C. and 3 wt. % $H_2O$

This example served as a baseline. The aminosilicone that was used was the GAP-1 material described above. With reference to FIG. 2, simulated exhaust gas (200 SLPM; 12% $CO_2$, balance $N_2$; 40° C.) was fed at the bottom of the absorber column. GAP-1/TEG (58.5 wt. % GAP-1s (Sivance), 38.5 wt. % TEG, 3 wt. % $H_2O$; 1 L/Min, 40° C.) was fed at the top of the absorber column. This corresponds to a molar ratio GAP-1:$CO_2$=1.8:1. Rich solvent, collected at the bottom of the absorber, was sent to the CSTR desorber. The temperature of the desorber was set at 125° C. The desorber pressure was 2.5 PSIG. The amount of $CO_2$ capture based on the analysis of liquid samples (FTIR) was 74%.

Example 2

Desorption with CSTR at 108° C. and 10 wt. % $H_2O$

Simulated exhaust gas (200 SLPM; 12% $CO_2$, balance $N_2$; 40° C.) was fed at the bottom of the absorber column. GAP-1/TEG (54 wt. % GAP-1s (Sivance), 36 wt. % TEG, 10 wt. % $H_2O$; 0.8 L/min, 40° C.) was fed at the top of the absorber column. This corresponds to a molar ratio GAP-1:$CO_2$=1.3:1. Rich solvent, collected at the bottom of the absorber, was sent to the CSTR desorber. The temperature of the desorber was set at 108° C., and the desorber pressure was 1 PSIG. The amount of $CO_2$ capture based on the analysis of liquid samples (FTIR) was 81%.

Example 3

Desorption with Steam Stripper at 100-107° C. and 10 wt. % $H_2O$

Simulated exhaust gas (200 SLPM; 12% $CO_2$, balance $N_2$; 40° C.) was fed at the bottom of the absorber column. GAP-1/TEG (54 wt. % GAP-1s (Sivance), 36 wt. % TEG, 10 wt. % $H_2O$; 0.8 L/min, 40° C.) was fed at the top of the absorber column. This corresponds to a molar ratio GAP-1:$CO_2$=1.3:1. Rich solvent, collected at the bottom of the absorber, was sent to the steam stripper regenerator. The temperature of the rich heat exchanger was set at 95° C.; and the temperature of the reboiler was set at 108° C. The reboiler pressure was 1 PSIG. The $CO_2$ capture based on the analysis of liquid samples (FTIR) was 86%. 60% of the desorption process occurred in the steam stripper column at temperatures between 100-104° C. The controlled addition of water and desorption in the steam stripper lowered the temperature of desorption by 17° C. (from 125° C. to 108° C.), and increased the amount of $CO_2$ capture to 86%.

Example 4

Desorption with CSTR at 108° C. and 13 wt. % $H_2O$

Simulated exhaust gas (200 SLPM; 12% $CO_2$, balance $N_2$; 40° C.) was fed at the bottom of the absorber column. GAP-1/TEG (52 wt. % GAP-1s (Sivance), 35 wt. % TEG, 13 wt. % $H_2O$; 0.8 L/min, 40° C.) was fed at the top of the absorber column. This corresponds to a molar ratio GAP-1:$CO_2$=1.3:1. Rich solvent, collected at the bottom of the absorber, was sent to the CSTR desorber. The temperature of the desorber was set at 108° C., and the desorber pressure was 2.5 PSIG. The amount of $CO_2$ capture based on the analysis of liquid samples (FTIR) was 82%.

Example 5

Desorption with Steam Stripper at 100° C.-107° C., and 13 wt. % $H_2O$

Simulated exhaust gas (200 SLPM; 12% $CO_2$, balance $N_2$; 40° C.) was fed at the bottom of the absorber column. GAP-1/TEG (52 wt. % GAP-1s (Sivance), 35 wt. % TEG, 10 wt. % $H_2O$; 0.8 SLM, 40° C.) was fed at the top of the absorber column. This corresponds to a molar ratio GAP-1:$CO_2$=1.3:1. Rich solvent, collected at the bottom of the absorber, was sent to the steam stripper regenerator. The temperature of the rich heat exchanger was set at 95° C.; and the temperature of the reboiler was set at 108° C. The reboiler pressure was 1 PSIG. $CO_2$ capture based on the analysis of liquid samples (FTIR) was 88%. 77% of the desorption process occurred in the steam stripper column at temperatures lower than 104° C. The controlled addition of water and desorption in the steam stripper at a lower temperature of desorption increased $CO_2$ capture to 88%.

Table 1, below, provides a summary of the results for Examples 1-5:

TABLE 1

| Examples | 1* | 2 | 3 | 4 | 5 |
|---|---|---|---|---|---|
| % $H_2O$ | 3 | 10 | 10 | 13 | 13 |
| Regenerator | CSTR [1] | CSTR | Steam Stripper | CSTR | Steam Stripper |
| GAP-1[2]: $CO_2$ (molar) | 1.8 | 1.3 | 1.3 | 1.3 | 1.3 |
| Desorption Temperature, ° C. | | | | | |
| Steam stripper range | NA | NA | 100-104 | NA | 100-104 |
| Regenerator | 125 | 108 | 108 | 108 | 108 |
| % GAP-1 reacted | | | | | |
| Absorber, bottom | 64 | 94 | 85 | 83 | 79 |
| Steam Stripper, bottom | NA | NA | 45 | NA | 27 |
| Lean Storage | 16 | 35 | 20 | 22 | 12 |
| $CO_2$ Capture % | 74 | 81 | 86 | 82 | 88 |

*Baseline example
[1] CSTR = Continuous stirred tank reactor
[2] GAP-1: Aminosilicone solvent
Lean solvent composition (dry-basis): 60 weight % GAP-1 (Sivance)/40 weight percent TEG.
Gas absorber inlet conditions: 12% $CO_2$ (balance $N_2$); 40° C.; Desorber pressure: 1 PSIG The examples and Table 1 demonstrate some of the beneficial aspects for embodiments of this invention. The increase in water addition from Example 1 to Example 2 lowers the desorption/regenerator temperature from 125° C. to 108° C., while increasing the $CO_2$ capture level from 74% to 81%. The lower desorption temperature presents key advantages described previously, e.g., a possible reduction in energy cost, while also helping to minimize heat-induced degradation of the absorption solvent. Moreover, the present inventors observed that the amount of absorption solvent (GAP-1) required for a given amount of $CO_2$ capture can desirably be reduced when employing a steam stripper apparatus, as compared to a CSTR device. However, the use of the CSTR is acceptable for some applications, and remains within the scope of this invention.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed:

1. A method for separating carbon dioxide (CO2) from a gas stream, comprising:
    feeding the gas stream to an absorber through which a lean aminosilicone solvent circulates;
    reacting the gas stream with the lean aminosilicone solvent within the absorber at a first temperature range, so as to generate a rich aminosilicone solvent stream and a clean gas stream with reduced CO2 in comparison with the initial gas stream;
    directing the rich aminosilicone solvent stream to a desorber that heat-treats the rich solvent in an endothermic desorption/regeneration reaction that is carried out at a second temperature range higher than the first temperature range; to regenerate lean aminosilicone solvent and to produce carbon dioxide gas;
    directing the regenerated, lean aminosilicone solvent through a steam-producing, indirect heat exchanger configured to supply steam to the desorber and sustain the endothermic desorption reaction and to lower the partial pressure of CO2 in the vapor phase in the lower region of the desorber;
    boiling an amount of steam in the indirect heat exchanger in excess of an amount that is required to provide the heat of reaction for aminosilicone desorption, so as to maintain steam in the vapor phase in the upper region of the desorber; and
    adding selected amounts of make-up water from a make-up water stream to the rich aminosilicone solvent stream, at one or more process locations between an exit site for the absorber and an inlet site for the desorber, to lower the viscosity of the rich aminosilicone solvent and to lower the temperature required for the desorption reaction, wherein CO2 and entrained water vapor/steam released during the desorption reaction is directed to a condenser to separate CO2 from the entrained water vapor/steam, such that water separated in the condenser is fed to the desorber as at least one source of the make-up water.

2. The method of claim 1, wherein the aminosilicone solvent is a liquid material, functionalized with one or more groups that reversibly react with CO2, and/or have a high affinity for CO2.

3. The method of claim 2, wherein the aminosilicone solvent is functionalized with one or more nitrogen atom-containing groups.

4. The method of claim 3, wherein the functional group comprises a primary or secondary aliphatic or aromatic amine, imine, amidine, a heterocyclic amino compound, or combinations thereof.

5. The method of claim 1, wherein the aminosilicone solvent is in admixture with at least one hydroxy-containing solvent, to form a solvent system.

6. The method of claim 5, wherein the hydroxy-containing solvent is a glycol.

7. The method of claim 5, wherein the absorber is equipped with at least one device to cool the solvent system during the reaction with the gas stream.

8. The method of claim 1, wherein the clean gas stream is directed to a water wash system that is also fed by at least one water source; and is configured to separate a stripped portion of the lean aminosilicone solvent from the clean gas stream, so as to generate a CO2-depleted exhaust gas and a mixture of the water and the stripped portion of the lean solvent.

9. The method of claim 8, wherein at least a portion of the mixture of the water and the stripped portion of the lean solvent is directed to a water-wash storage tank that is capable of separating the water from the stripped portion of the solvent.

10. The method of claim 9, wherein the stripped portion of the solvent is directed back to the absorber.

11. The method of claim 10, wherein the stripped portion of the solvent being directed back to the absorber is directed to a lean solvent storage tank situated between the water-wash storage tank and the absorber.

12. The method of claim 1, wherein the lean aminosilicone solvent passing through the steam-producing, indirect heat exchanger is directed back to the absorber.

13. The method of claim 12, wherein the lean aminosilicone solvent being directed back to the absorber passes through at least one rich-lean heat exchanger situated between the absorber and the desorber, to reduce the temperature of the solvent to the first temperature range for the absorption reaction.

14. The method of claim 13, wherein adding selected amounts of make-up water is carried out at a location between the absorber and the rich-lean heat exchanger or at a location between the rich-lean heat exchanger and the desorber.

15. The method of claim 13, wherein adding selected amounts of make-up water is carried out at a location between the absorber and the rich-lean heat exchanger and also at a location between the rich-lean heat exchanger and the desorber.

16. The method of claim 13, wherein the lean aminosilicone solvent being directed back to the absorber and passing through the rich-lean heat exchanger is directed through at least one additional cooling mechanism.

17. The method of claim 1, wherein the amount (total) of additional make-up water is an amount sufficient to provide a steady state water content of the rich aminosilicone solvent stream between about 5 weight percent and about 25 weight percent.

18. The method of claim 1, wherein the first temperature range for reaction of the fluid stream with the lean aminosilicone solvent within the absorber is from about 25° C. to about 80° C.

19. The method of claim 1, wherein the second temperature range for the desorption/regeneration reaction is in the range of about 90° C. to about 140° C.

20. The method of claim 1, wherein the amount of steam supplied to the desorber apparatus is sufficient to decrease the vapor pressure of CO2 in the desorber.

21. The method of claim 1, wherein lean solvent includes at least one of oxidation inhibitors, anti-foaming agents, or corrosion inhibitors.

22. The method of claim 1, further comprising
    receiving the lean solvent at a purge-reclaim station located downstream from the indirect heat exchanger, and
    filtering, via the purge-reclaim station, detached aminosilicone molecules from the lean solvent.

23. A method for separating carbon dioxide (CO2) from a gas stream, comprising:

reacting the gas stream with a lean aminosilicone solvent in an absorber, resulting in a rich aminosilicone solvent that is then treated in a desorber to release the CO2 and regenerate lean aminosilicone solvent in a desorption reaction;

directing the regenerated solvent into a steam-producing, indirect heat exchanger configured to supply steam to the desorber to augment the desorption reaction; and adding selected amounts of make-up water to the rich aminosilicone solvent at one or more process locations between the absorber and the desorber, to lower the viscosity of the solvent and to lower the temperature required for the desorption reaction;

wherein CO2 and entrained water vapor/steam released during the desorption reaction is directed to a condenser to separate CO2 from the entrained water vapor/steam, such that water separated in the condenser is fed to the desorber as at least one source of the make-up water.

\* \* \* \* \*